(12) United States Patent
Earnshaw et al.

(10) Patent No.: US 10,003,730 B2
(45) Date of Patent: Jun. 19, 2018

(54) METHOD AND DEVICE FOR SHARING A CAMERA FEATURE

(71) Applicant: BlackBerry Limited, Waterloo (CA)

(72) Inventors: Andrew Mark Earnshaw, Kanata (CA); Kalu Onuka Kalu, Toronto (CA); Jan Staffan Lincoln, Lund (SE)

(73) Assignee: Blackberry Limited, Waterloo Ontario (CA)

(*) Notice: Subject to any disclaimer, the term of this patent is extended or adjusted under 35 U.S.C. 154(b) by 2 days.

(21) Appl. No.: 14/882,594

(22) Filed: Oct. 14, 2015

(65) Prior Publication Data

US 2016/0037048 A1    Feb. 4, 2016

Related U.S. Application Data

(63) Continuation of application No. 13/408,847, filed on Feb. 29, 2012, now Pat. No. 13,408,847.

(51) Int. Cl.
*H04N 5/232* (2006.01)
*H04N 5/225* (2006.01)
(Continued)

(52) U.S. Cl.
CPC ..... *H04N 5/23203* (2013.01); *G06K 9/00255* (2013.01); *G06K 9/00288* (2013.01); *H04N 1/00204* (2013.01); *H04N 1/00307* (2013.01); *H04N 1/00347* (2013.01); *H04N 5/2256* (2013.01); *H04N 5/23293* (2013.01);
(Continued)

(58) Field of Classification Search
CPC .......... H04N 5/23203; H04N 5/23206; H04N 5/2256; H04N 5/2354

USPC ........ 348/211.1, 211.2, 211.3, 211.8, 211.11, 348/211.12, 231.9, 370, 371
See application file for complete search history.

(56) References Cited

U.S. PATENT DOCUMENTS 5,023,639 A   6/1991  Ushiro et al.
6,353,711 B1  3/2002  Numako et al.
(Continued)

FOREIGN PATENT DOCUMENTS

EP    2290576    3/2011

OTHER PUBLICATIONS

Rosa Golijan; "How to Turn an iPhone Into a Wireless iPad Camera", http://gizmodo.com/5511115/how-to-turn-an-iphone-into-a-wireless-ipad-camera, Apr. 6, 2010; retrieved on Feb. 1, 2012.
(Continued)

Primary Examiner — Hung Lam
(74) Attorney, Agent, or Firm — Rowand LLP

(57) ABSTRACT

Methods and electronic devices for sharing a camera feature are described. In one aspect, the present disclosure describes a method. The method is performed by a first electronic device which has a camera. The method includes: establishing wireless communications between the first electronic device and a second electronic device using a short range communication module of the first electronic device; and entering a camera-feature-sharing mode in which a camera-related feature of the second electronic device is accessible to the first electronic device using the short range communication module and in which a camera-related feature of the first electronic device is accessible to the second electronic device using the short range communication module.

19 Claims, 7 Drawing Sheets

(51) Int. Cl.
    *H04N 1/00*     (2006.01)
    *G06K 9/00*     (2006.01)
    *H04N 5/235*     (2006.01)
    *H04N 101/00*     (2006.01)

(52) U.S. Cl.
    CPC ....... *H04N 5/2354* (2013.01); *H04N 2101/00* (2013.01); *H04N 2201/001* (2013.01); *H04N 2201/0041* (2013.01); *H04N 2201/0055* (2013.01); *H04N 2201/0084* (2013.01)

(56) References Cited

U.S. PATENT DOCUMENTS

| | | | |
|---|---|---|---|
| 7,965,335 B2 | 6/2011 | Niblock | |
| 2003/0133018 A1 | 7/2003 | Ziemkowski | |
| 2004/0176944 A1* | 9/2004 | Noda | G06F 17/2217 704/3 |
| 2007/0147334 A1* | 6/2007 | Guthrie | H04W 4/08 370/349 |
| 2007/0236505 A1* | 10/2007 | Jung | G06T 3/4023 345/589 |
| 2007/0254640 A1 | 11/2007 | Bliss | |
| 2008/0147771 A1* | 6/2008 | Bertolino | H04W 48/16 709/201 |
| 2009/0060288 A1* | 3/2009 | Myers | G06K 9/00288 382/118 |
| 2009/0149205 A1* | 6/2009 | Heredia | H04L 51/04 455/466 |
| 2010/0202767 A1 | 8/2010 | Shirakawa | |
| 2012/0121126 A1* | 5/2012 | Hwang | G06K 9/00228 382/103 |
| 2012/0177016 A1* | 7/2012 | Trainin | H04W 84/20 370/338 |
| 2013/0077833 A1* | 3/2013 | Kritt | G06K 9/00677 382/118 |
| 2015/0236860 A1* | 8/2015 | Brown | H04L 9/3268 713/156 |

OTHER PUBLICATIONS

Headlight Software, Inc. "Camera for iPad", http://itunes.apple.com/ca/app/camera-for-ipad/id366129244?mt=8, Mar. 22, 2011; retrieved on Feb. 1, 2012.

Ken Rockwell, "How to Use Nikon Strobes Wirelessly, for Free?",http://www.kenrockwell.com/nikon/ittlslave.htm, 2006.

Stu Eddins, Picture Correct, http://www.picturecorrect.com/tips/how-to-use-remote-flash-triggers-in-photography/, Jul. 6, 2011.

Uploaded by theiphoneczar on Apr 11, 2010, "Taking Pictures on an iPad—Camera for iPad", Youtube.com, http://www.youtube.com/watch?v=dothwcOu1ll.

Uploaded by fishyy15 on Jan 1, 2011, Youtube.com, "http://www.youtube.com/watch?v=u5UWdjyHhoE".

CIPO, CA Office Action relating to Application No. 2,802,293, dated Jun. 2, 2014.

CIPO, CA Office Action relating to Application No. 2,802,293, dated Apr. 30, 2015.

CIPO, CA Office Action relating to Application No. 2,802,293, dated Apr. 5, 2016.

\* cited by examiner

METHOD AND DEVICE FOR SHARING A CAMERA FEATURE

TECHNICAL FIELD

The present disclosure relates to electronic devices having cameras and, more particularly, to methods and electronic devices for sharing camera features with other electronic devices.

BACKGROUND

Electronic devices, such as smartphones and tablet computers, are sometimes equipped with cameras. Cameras may, for example, be used to allow a user to capture a video or a still photograph.

Electronic devices with cameras typically provide a number of camera features which are provided by hardware and software of the electronic devices. For example, such devices sometimes have the ability to zoom, focus on a subject, and trigger a camera flash. Electronic devices sometimes have the ability to perform image processing on a captured image. For example, electronic devices are sometimes configured to remove a red-eye effect, apply a software-based zoom, or to provide another effect.

Such camera features of electronic devices are typically limited by the hardware and/or software capabilities of the electronic device.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In one aspect, the present disclosure describes a method. The method is performed by a first electronic device which has a camera. The method includes: establishing wireless communications between the first electronic device and a second electronic device using a short range communication module of the first electronic device; entering a camera-feature-sharing mode in which a camera-related feature of the second electronic device is accessible to the first electronic device using the short range communication module and in which a camera-related feature of the first electronic device is accessible to the second electronic device using the short range communication module.

In another aspect, the present disclosure describes a first electronic device. The first electronic device includes a camera and a short range communication module for establishing wireless communications between the first electronic device and a second electronic device. The first electronic device also includes a processor configured to: enter a camera-feature-sharing mode in which a camera-related feature of the second electronic device is accessible to the first electronic device and a camera-related feature of the first electronic device is accessible to the second electronic device using the short range communication module.

In yet another aspect, the present disclosure describes a method. The method is performed by a first electronic device. The first electronic device has a camera. The method includes: establishing communications between the first electronic device and a second electronic device; and receiving input instructing the first electronic device to capture an image from the camera of the first electronic device; and in response to receiving the input: triggering a flash associated with the second electronic device; and capturing an image using the camera associated with the first electronic device.

Other example embodiments of the present disclosure will be apparent to those of ordinary skill in the art from a review of the following detailed descriptions in conjunction with the drawings.

Example Electronic Devices

Figure 1:
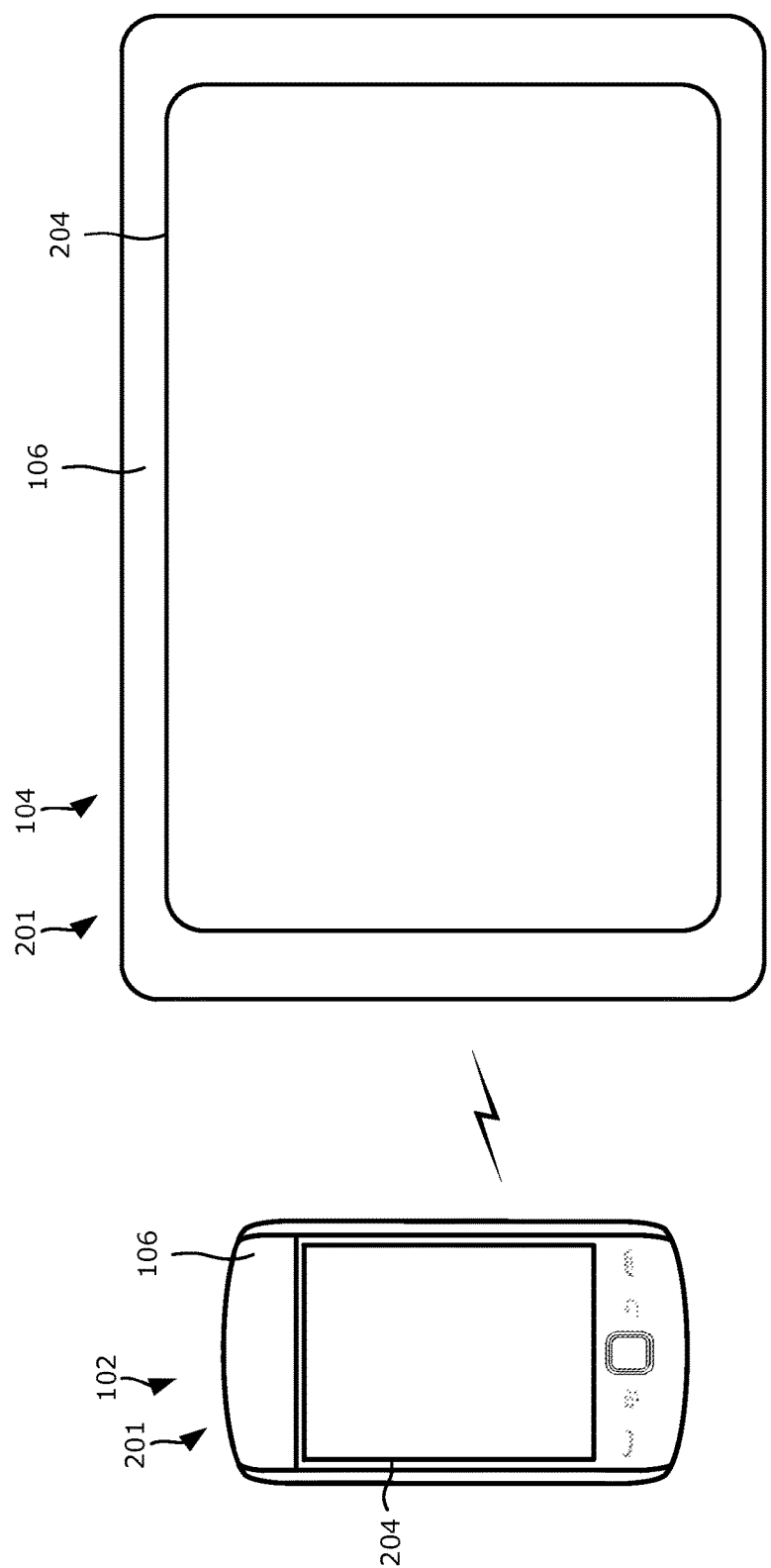
FIG. 1 is a top view of an example first electronic device and an example second electronic device in accordance with example embodiments of the present disclosure.

Referring first to FIG. 1, a top view of two example electronic devices 201 is illustrated. The electronic devices 201 include a first electronic device 102 and a second electronic device 104.

In the example embodiment illustrated, the first electronic device 102 is a smartphone and the second electronic device 104 is a tablet computer. A smartphone is a mobile phone which offers more advanced computing capability than a basic non-smart cellular phone. For example, a smartphone may have the ability to run third party applications which are stored on the smartphone.

A tablet computer (which may also be referred to as a tablet) is an electronic device which is generally larger than a mobile phone (such as a smartphone) or personal digital assistant. Many mobile phones or personal digital assistants are designed to be pocket sized. That is, mobile phones or personal digital assistants are generally small enough to be carried by a person easily, often in a shirt or pant pocket, while tablet computers are larger and may not fit within pant pockets. For example, many tablet computers have a height which is seven inches (7") or more. In some example embodiments, the tablet computer may be a slate computer. A slate computer is a tablet computer which does not include a dedicated keyboard. A slate computer may allow for text input through the use of a virtual keyboard or an external keyboard which connects to the slate computer via a wired or wireless connection.

While FIG. 1 illustrates an embodiment where the first electronic device 102 is a smartphone and the second electronic device 104 is a tablet computer, the first electronic device 102 and/or the second electronic device 104 may take other forms in other embodiments. For example, in some example embodiments, the first electronic device 102 may be a smartphone and the second electronic device 104 may also be a smartphone. In other example embodiments, the first electronic device 102 may be a tablet computer and the second electronic device 104 may also be a tablet computer. In other example embodiments, the first electronic device 102 may be a tablet computer and the second electronic device 104 may be a smartphone.

In other embodiments, the first electronic device 102 and/or the second electronic device 104 may be devices of another type. For example, in various example embodiments any one or both of the first electronic device 102 or the second electronic device 104 may be: a multiple-mode communication device configured for both data and voice communication, a mobile telephone such as a smartphone, a wearable computer such as a watch, a tablet computer such as a slate computer, a personal digital assistant (PDA), a television, a digital camera, or a computer system. The first electronic device 102 and/or the second electronic device 104 may take other forms apart from those specifically listed above.

FIG. 1 illustrates a top view of the electronic devices 201. The top view of the electronic devices 201 illustrates a front face 106 of each of the electronic devices 201 (i.e. the first electronic device 102 and the second electronic device 104). The front face 106 of the electronic device 201 is a side of the electronic device 201 which includes a main display 204 of the electronic device 201. The front face 106 of the electronic device 201 is a side of the electronic device 201 which is configured to be viewed by a user.

Figure 2:
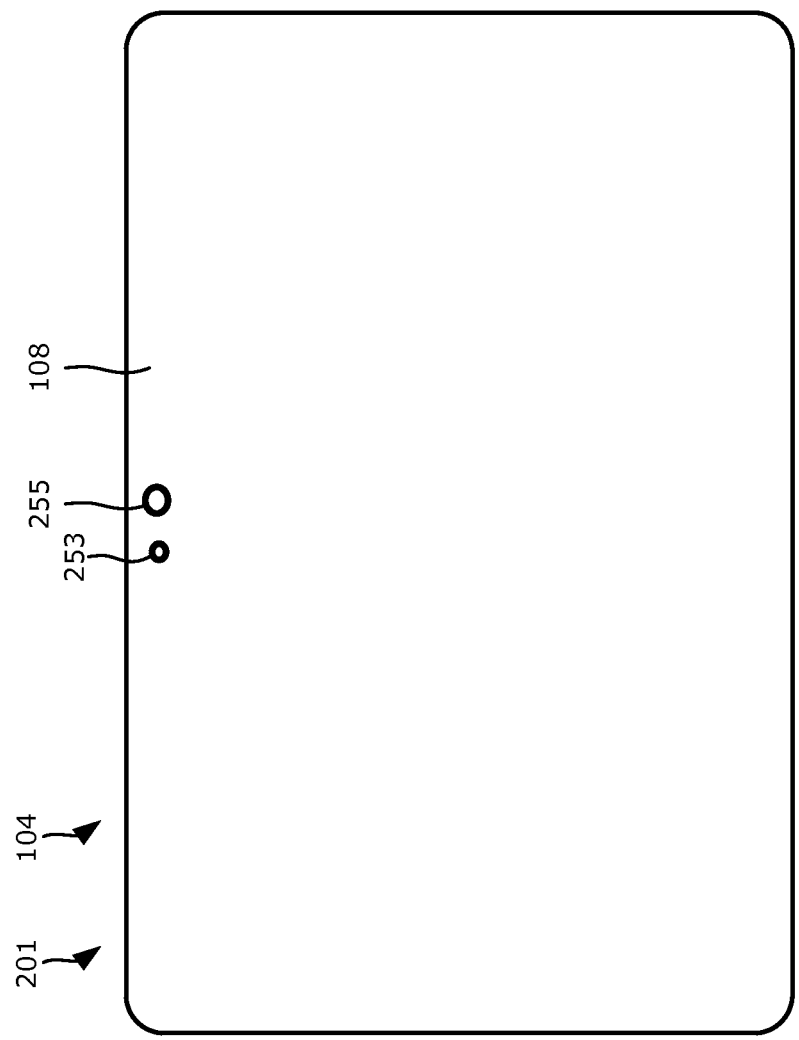
FIG. 2 is a rear view of the example first electronic device and the example second electronic device of FIG. 1 in accordance with example embodiments of the present disclosure.
Figure 2:
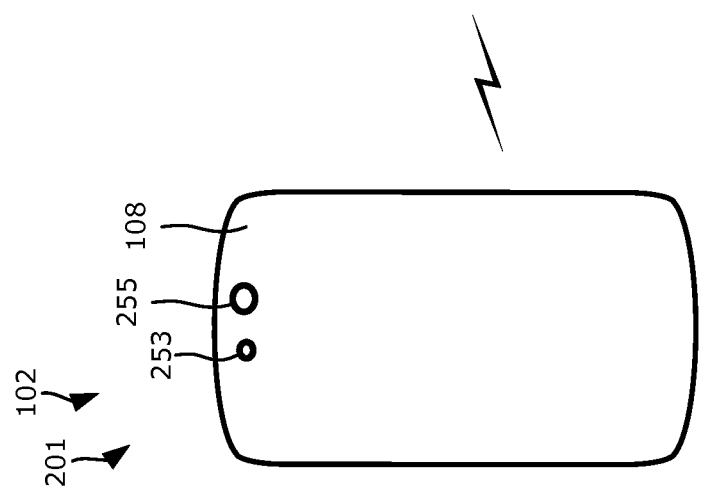

FIG. 2 illustrates a rear view of the electronic devices 201. The rear view of the electronic devices illustrates rear faces 108 of the electronic devices 201 (i.e. the first electronic device 102 and the second electronic device 104). The rear face 108 is a side of the electronic device 201 which does not include a main display 204 of the electronic device 201. In the embodiment illustrated, the rear face 108 is a side of the electronic device 201 which is opposite the front face 106 (FIG. 1) of the electronic device 201. That is, the rear face 108 may be substantially parallel to the front face 106 of the electronic device.

The first electronic device 102 and the second electronic device 104 each include a camera 253. The cameras 253 are configured to generate camera data, such as images in the form of still photographs and/or motion video. The camera data may be captured in the form of an electronic signal which is produced by an image sensor associated with the camera 253. More particularly, the image sensor (not shown) is configured to produce an electronic signal in dependence on received light. That is, the image sensor converts an optical image into an electronic signal, which may be output from the image sensor by way of one or more electrical connectors associated with the image sensor. The electronic signal represents electronic image data (which may also be referred to as camera data). The camera of the first electronic device 102 may generate first-device camera data and the camera of the second electronic device 104 may generate second-device camera data.

In the embodiment illustrated, the electronic devices 201 include rear facing cameras 253. A rear facing camera is a camera 253 which is located to obtain images of a subject near a rear face 108 of the electronic device 201. That is, the rear facing camera may be located on or near a rear face 108 of the electronic device 201. In at least some embodiments, the rear facing camera is mounted internally within a housing of the electronic device 201 beneath a region of the rear face 108 which transmits light. For example, the camera 253 may be mounted beneath a clear portion of the housing which allows light to be transmitted to the internally mounted camera 253.

In other embodiments (not illustrated), one or both of the electronic devices 201 (e.g. the first electronic device 102 and/or the second electronic device 104) may include a front facing camera instead of or in addition to the rear facing camera. A front facing camera is a camera 253 which is located to obtain images of a subject near the front face 106 (FIG. 1) of the electronic device 201. That is, the front facing camera may be generally located at or near a front face 106 of the electronic device 201. The front facing camera may be located anywhere on the front surface of the electronic device; for example, the front facing camera may be located above or below the display 204. In at least some example embodiments, the front facing camera may be provided in a central location relative to the display 204 to facilitate image acquisition of a face. In at least some embodiments, the front facing camera may be used, for example, to allow a user of the electronic device 201 to engage in a video-based chat with a user of another electronic device 201. In at least some embodiments, the front facing camera is mounted internally within a housing of the electronic device 201 beneath a region of the front face 106 which transmits light. For example, the front facing camera may be mounted beneath a clear portion of the housing which allows light to be transmitted to the internally mounted camera 253.

In at least some embodiments (not shown), one or both of the electronic devices 201 may include a front facing camera and also a rear facing camera. The rear facing camera may obtain images which are not within the field of view of the front facing camera. The fields of view of the front facing and rear facing cameras may generally be in opposing directions.

In at least some embodiments, one or both of the electronic devices 201 may have additional camera hardware which may complement the camera 253. For example, in the embodiment illustrated, the electronic devices 201 each include a flash 255. The flash 255 may, in at least some embodiments, be a light emitting diode (LED) flash. The flash 255 emits electromagnetic radiation. More particularly, the flash 255 may be used to produce a brief bright light which may facilitate picture-taking in low light conditions. That is, the flash 255 may emit light immediately before an image is captured using the camera 253. In the embodiment illustrated, the flash 255 is located to emit light at the rear face 108 of the electronic devices 201.

Figure 3:
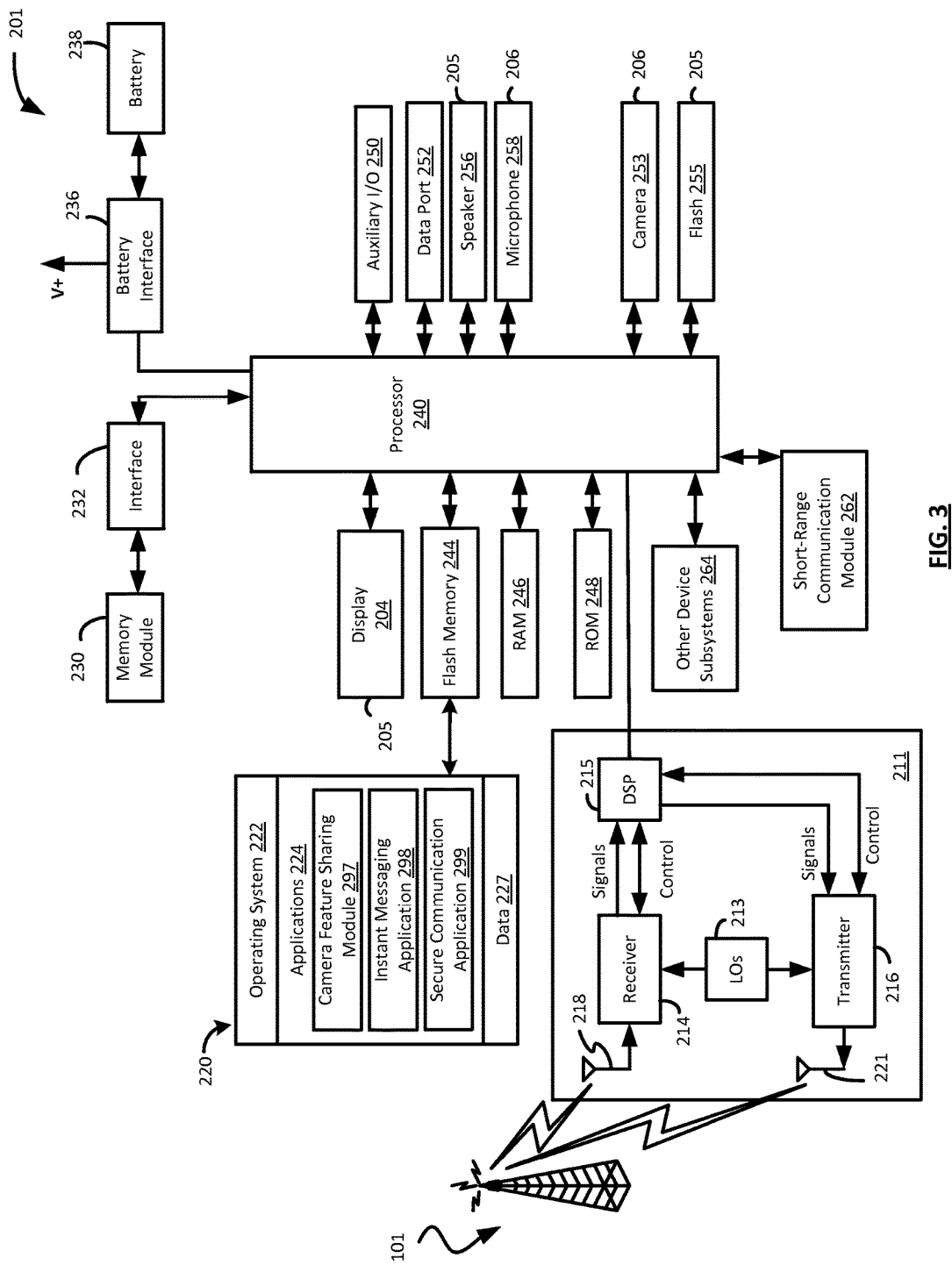
FIG. 3 is a block diagram illustrating components of an example electronic device in accordance with example embodiments of the present disclosure.

As will be described in greater detail below, the first electronic device 102 and the second electronic device 104 are configured to communicate with one another. In at least some embodiments, the first electronic device 102 and the second electronic device 104 are configured to communicate wirelessly with one another. More particularly, the first electronic device 102 and the second electronic device 104 may each include a short range communication module 262 (FIG. 3). The first electronic device 102 and the second electronic device 104 may communicate directly with one another over the short range communication module 262.

That is, in at least some embodiments, the first electronic device 102 and the second electronic device 104 do not rely on other electronic devices (such as a router and/or a modem) to act as an intermediary between the electronic devices 201.

In some embodiments, the first electronic device 102 and the second electronic device 104 are configured to communicate using a Bluetooth™ communication protocol. In other embodiments, the first electronic device 102 and the second electronic device 104 are configured to communicate with one another using a Wi-Fi communication protocol. Other communication protocols may be used for communications between the first electronic device 102 and the second electronic device 104 in other embodiments.

Referring now to FIG. 3, a block diagram of an example electronic device 201 is illustrated. The first electronic device 102 and/or the second electronic device 104 may, in at least some embodiments, include components of FIG. 3. That is, the first electronic device 102 or the second electronic device 104 or both the first electronic device 102 and the second electronic device 104 may, in at least some embodiments, be of the type described below with reference to FIG. 3. It will, however, be appreciated that one or both of the first electronic device 102 or the second electronic device 104 may not include all components described below with reference to FIG. 3 in all embodiments.

The electronic device 201 of FIG. 3 may include a housing which houses components of the electronic device 201. Internal components of the electronic device 201 may be constructed on a printed circuit board (PCB). The electronic device 201 includes a controller including at least one processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, one or more microphones 258, one or more cameras 253, and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as a display 204 (which may be a liquid crystal display (LCD)), a flash 255, one or more speakers 256, or other output interfaces), a short range communication module 262, and other device subsystems generally designated as 264. Some of the subsystems shown in FIG. 3 perform communication-related functions, whereas other subsystems may provide "resident" or on-device functions.

The electronic device 201 may include a touchscreen display in some example embodiments. The touchscreen display may be constructed using a touch-sensitive input surface connected to an electronic controller. The touch-sensitive input surface overlays the display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display acts as both an input interface 206 and an output interface 205.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the electronic device 201 and a single antenna may be shared by both receiver 214 and transmitter 216, as is known in the art. The particular design of the wireless communication subsystem 211 depends on the wireless network 101 in which the electronic device 201 is intended to operate.

The electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

In some example embodiments, the auxiliary input/output (I/O) subsystems 250 may include an external communication link or interface, for example, an Ethernet connection. The electronic device 201 may include other wireless communication interfaces for communicating with other types of wireless networks; for example, a wireless network such as an orthogonal frequency division multiplexed (OFDM) network.

In some example embodiments, the electronic device 201 also includes a removable memory module 230 (typically including flash memory) and a memory module interface 232. Network access may be associated with a subscriber or user of the electronic device 201 via the memory module 230, which may be a Subscriber Identity Module (SIM) card for use in a GSM network or other type of memory module for use in the relevant wireless network type. The memory module 230 may be inserted in or connected to the memory module interface 232 of the electronic device 201.

The electronic device 201 may store data 227 in an erasable persistent memory, which in one example embodiment is the flash memory 244. In various example embodiments, the data 227 may include service data having information required by the electronic device 201 to establish and maintain communication with the wireless network 101. The data 227 may also include user application data such as email messages, address book and contact information, calendar and schedule information, notepad documents, image files, and other commonly stored user information stored on the electronic device 201 by its user, and other data.

The data 227 stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the electronic device 201 memory.

The data port 252 may be used for synchronization with a user's host computer system. The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer for processing.

The electronic device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short range communication module provides for communication between the electronic device 201 and different systems or devices, which need not necessarily be similar devices. For example, the short range communication module 262 may include an infrared device and associated circuits and components, or a wireless bus protocol compliant communication mechanism such as a Bluetooth® communication module to provide for communication with similarly-enabled systems and devices. In at least some example embodiments, the short range communication module 262 allows the electronic device 201 to communicate directly with another electronic device having a similar short range communication module 262. That is, in at least some embodiments, the short range communication module 262 allows the electronic device 201 to communicate directly with other electronic devices 201 without requiring an intermediary system or device (such as a server, router, modem, etc.) to facilitate such communications. In at least some embodiments, the short range communication module 262 is configured to provide Wi-Fi communications with other electronic devices 201.

The electronic device 201 includes a camera 253. The camera is capable of capturing camera data such as images in the form of still photographs and/or motion video. The camera data may be captured in the form of an electronic signal which is produced by an image sensor. The camera 253 is, in at least some embodiments, a rear facing camera (as shown in FIG. 2). However, in other embodiments, the camera 253 may be a front facing camera. In further embodiments, the electronic device 201 may include both a front facing camera and a rear facing camera.

In the embodiment illustrated, the camera 253 is illustrated as being coupled directly with a main processor 240 which controls the camera. In at least some embodiments, the camera 253 may include a dedicated image signal processor which may provide at least some camera-related functions. For example, in at least some embodiments, the image signal processor of the camera 253 may be configured to provide auto-focusing functions.

The electronic device 201 also includes a flash 255. As noted above, the flash 255 is used to illuminate a subject while the camera 253 captures an image of the subject. The flash 255 may, for example, be used in low light conditions. In the example embodiment illustrated, the flash 255 is coupled with the main processor 240 of the electronic device 201. However, in other embodiments, the flash 255 may be coupled to an image signal processor (not shown) of the camera 253 which may be used to trigger the flash. The image signal processor may, in at least some embodiments, control the flash 255. In at least some such embodiments, applications associated with the main processor 240 may be permitted to trigger the flash 255 by providing an instruction to the image signal processor to instruct the image signal processor to trigger the flash 255.

A predetermined set of applications that control basic device operations, including data and possibly voice communication applications may be installed on the electronic device 201 during or after manufacture. Additional applications and/or upgrades to an operating system 222 or software applications 224 may also be loaded onto the electronic device 201 through the wireless network 101, the auxiliary I/O subsystem 250, the data port 252, the short range communication module 262, or other suitable device subsystems 264. The downloaded programs or code modules may be permanently installed; for example, written into the program memory (e.g. the flash memory 244), or written into and executed from the RAM 246 for execution by the processor 240 at runtime.

In some example embodiments, the electronic device 201 may provide two principal modes of communication: a data communication mode and a voice communication mode. In the data communication mode, a received data signal such as a text message, an email message, or webpage download will be processed by the communication subsystem 211 and input to the processor 240 for further processing. For example, a downloaded webpage may be further processed by a web browser or an email message may be processed by the email messaging application and output to the display 204. A user of the electronic device 201 may also compose data items, such as email messages; for example, using an input interface 206 in conjunction with the display 204. These composed items may be transmitted through the communication subsystem 211 over the wireless network 101.

In the voice communication mode, the electronic device 201 provides telephony functions and may operate as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the electronic device 201. Although voice or audio signal output may be accomplished primarily through the speaker 256, the display 204 may also be used to provide an indication of the identity of a calling party, duration of a voice call, or other voice call related information.

The processor 240 operates under stored program control and executes software modules 220 stored in memory such as persistent memory; for example, in the flash memory 244. As illustrated in FIG. 3, the software modules 220 may include operating system software 222 and one or more additional applications 224 or modules such as, for example, a camera feature sharing module 297, an instant messaging application 298 and/or a secure communication application 299.

In the example embodiment of FIG. 3, the camera feature sharing module 297, the instant messaging application 298 and the secure communication application 299 are illustrated as being implemented as stand-alone applications 224. However, in other example embodiments, the camera feature sharing module 297, the instant messaging application 298 and/or the secure communication application 299 could be provided by another application or module such as, for example, the operating system software 222. Furthermore, while the camera feature sharing module 297, the instant messaging application 298 and the secure communication application 299 are each illustrated with a single block, the functions or features provided by any of the camera feature sharing module 297, the instant messaging application 298 and/or the secure communication application 299 could, in at least some embodiments, be divided up and implemented by a plurality of applications and/or modules. Similarly, in at least some embodiments, features of two or more of these applications or modules could be provided by a single application or software module.

The camera feature sharing module 297 is configured to allow the electronic device 201 to enter a camera-feature-sharing mode with another electronic device 201 having a similarly configured camera feature sharing module 297. In the camera-feature-sharing mode, the electronic device 201 (which may be referred to as a first electronic device 102) is permitted to access a camera-related feature of another electronic device 201 (which may be referred to as a second electronic device 104) using the short range communication module 262. Similarly, in the camera-feature-sharing mode, the electronic device 201 (which may be referred to as a first electronic device 102) allows another electronic device 201 (which may be referred to as a second electronic device 104) to access a camera-related feature of the electronic device 201 (i.e. of the first electronic device 102) using the short range communication module 262.

Accordingly, when the camera feature sharing module 297 places the electronic device 201 in the camera-feature-sharing mode, bi-directional sharing of camera-related features is provided on the electronic device 201. That is, the electronic device 201 permits another electronic device to access a camera-related feature and is also, itself, permitted to access a camera-related feature of the other electronic device. Thus, in at least some embodiments, in the camera-feature-sharing mode, the electronic device 201 and another electronic device share an equal status, with either electronic device being permitted to access a camera-related feature of the other of the electronic devices. That is, in at least some embodiments, in the camera-feature-sharing mode, the electronic devices 201 (i.e. the first electronic device 102 and the second electronic device 104) do not have a master/slave relationship); both of the electronic devices 201 are permitted to access a camera-related feature of the other of the electronic devices. That is, in at least some embodiments, the electronic devices 201 (the first electronic device 102 and the second electronic device 104) have bidirectional sharing of camera-related features.

The camera-feature sharing module 297 will be discussed in greater detail below with reference to FIGS. 4 to 8. As will be described in greater detail below, in at least some embodiments, in the camera-feature-sharing mode, the electronic device 201 may receive camera data from another electronic device and may, in at least some embodiments, display a viewfinder for the other electronic device on its display 204. For example, a display 204 on a first electronic device 102 may show the field of view of a camera on a second electronic device 104. The first electronic device 102 may allow a user to input an instruction on the first electronic device (e.g. via an input interface 206) to command the first electronic device 102 to capture an image based on camera data generated by a camera of the second electronic device 104. That is, the first electronic device 102 may capture an image based on camera data generated by the second electronic device.

Similarly, in the camera-feature-sharing mode, a first electronic device 102 may allow a second electronic device 104 to access a camera-related feature of the first electronic device 102. For example, the first electronic device may provide camera data generated from its camera 253 to the second electronic device. In some embodiments, the first electronic device may allow the second electronic device to cause the first electronic device to capture an image using the camera 253 of the first electronic device.

In at least some embodiments, in the camera-feature-sharing mode, the first electronic device may access an image processing capability of the second electronic device if the second electronic device has an image processing capability that the first electronic device does not have. Similarly, the second electronic device may access an image processing capability of the first electronic device if the first electronic device has an image processing capability that the second electronic device does not have.

In at least some embodiments, in the camera-feature-sharing mode, the electronic device 201 (which may be the first electronic device 102 described with reference to FIGS. 1 and 2) is permitted to control a flash of another electronic device 201 (which may be the second electronic device 104 described with reference to FIGS. 1 and 2). Similarly, a first electronic device may allow its flash 255 to be controlled by a second electronic device 104. Accordingly, in at least some embodiments, in the camera-feature-sharing mode, one electronic device may act as a camera and another electronic device may act as an auxiliary flash. The electronic device which acts as an auxiliary flash may, for example, be directed at a subject which the electronic device which acts as a camera is taking a picture of. For example, where the first electronic device 102 is to act as a camera and the second electronic device 104 acts as a flash, the flash of the second electronic device 104 may be directed at the side of a subject and the camera of the first electronic device 102 may be directed at the front of a subject. When a user of one of the electronic devices wishes to capture an image, the flash on the second electronic device 104 is triggered and the camera on the first electronic device 102 captures an image. The flash on the first electronic device 102 may, in at least some embodiments, be triggered concurrently with the flash on the second electronic device 104. In at least some embodiments, the first electronic device 102 may act as a viewfinder for the second electronic device 104 allowing the user of the first electronic device 102 to observe where the flash is directed.

Other features of the camera-feature sharing module 297 will be discussed in greater detail below with reference to FIGS. 4 to 8.

In at least some embodiments, one or more camera-related features may be shared by the electronic device 201 with another electronic device over a secure connection. More particularly, in at least some embodiments, the electronic device 201 may establish a secure wireless connection with another electronic device and may use the secure wireless connection for sharing camera-related features. In at least some embodiments, the electronic device 201 may include a secure communication application 299. The secure communication application 299 may be configured to provide for multilayered encrypted communications with another electronic device.

More particularly, the electronic device may be configured to provide a communication protocol encryption layer of security. That is, the communication protocol itself may provide for encrypted communications with other electronic devices. For example, in some embodiments, the electronic device 201 may communicate with another electronic device 201 using a Bluetooth™ communication protocol. The Bluetooth communication protocol may use a Bluetooth pairing procedure to create a trusted relationship between the electronic devices. During the pairing process, the electronic devices may establish a shared secret, which may be stored by both electronic devices. This shared secret may be used to provide a communication protocol encryption layer of security. That is, communications between paired electronic devices may be secured based on the shared secret.

In at least some embodiments, the secure communication application 299 may provide a further layer of encryption. More particularly, the secure communication application 299 may provide an application protocol encryption layer. The application protocol encryption layer provides additional security and may rely on a further shared secret. In at least some embodiments, when the electronic device 201 is first connected to another electronic device, a pairing key is generated. The pairing key may be used with the application protocol encryption layer. In at least some embodiments, the pairing key may be used to encrypt and decrypt data that is sent between electronic devices and to authenticate the connection between the electronic devices. For example, in some embodiments, the pairing key may be used with AES-256 encryption to encrypt and decrypt data that is sent between the electronic devices and the pairing key may be used with SHA-256 to authenticate the connection between the electronic devices. Other encryption protocols may also be used in other embodiments.

In at least some embodiments, the electronic device 201 may include an instant messaging application 298. The instant messaging application 298 is configured to provide real-time direct communications between two or more electronic devices 201. More particularly, the instant messaging application 298 allows a user of the electronic device 201 to send and receive messages (such as text-based messages) to users of other electronic devices. The instant messaging application 298 may be configured to display status updates regarding messages or conversations to notify a user of the electronic device whether another party has received a message, read the message and/or is composing a response to the message (e.g. whether the recipient is typing).

In at least some embodiments, the instant messaging application 298 is configured to provide for group-based instant messaging. In at least some embodiments, users of electronic devices are permitted to define a group. A group may consist of users or electronic devices who are members of the group. In at least some embodiments, when the electronic device 201 posts a message to a group, it may be sent to all members of the group. Accordingly, groups allow electronic devices to communicate with a plurality of other electronic devices.

In at least some embodiments, the instant messaging application 298 may be used to select another electronic device to share camera-related features with. That is, the instant messaging application 298 may be used to select one or more other electronic devices which the electronic device 201 will share a camera-related feature with. For example, in some embodiments, the instant messaging application 298 allows a user to input an instruction to share a camera feature of the electronic device with an instant messaging contact. In response to receiving such an instruction, the electronic device may enter the camera-feature-sharing mode with an electronic device associated with that instant messaging contact. That is, the instant messaging application 298 may be used to grant access to a camera-related feature (of a first electronic device) to another electronic device. In at least some embodiments, when an instruction is received via the instant messaging application 298 to instruct the electronic device to enter the camera-feature-sharing mode with another electronic device, the camera-feature sharing module 297 may be engaged and the features of the camera-feature sharing module which are discussed herein may be provided.

Similarly, in at least some embodiments, when an instruction is received via the instant messaging application 298 to instruct the electronic device to enter the camera-feature-sharing mode with another electronic device, a secure connection between the electronic devices may be established. In at least some embodiments, the secure communication application 299 may be engaged in order to provide multiple layers of security in such communications. In at least some embodiments, the instant messaging application 298 may be used to share information which may be used by the electronic devices to set up such a secure connection. For example, in at least some embodiments, the instant messaging application 298 may be used to pass data which will be used to set up a secure connection. For example, the instant messaging application 298 may be used to establish one or more shared secrets which may be used to provide communication protocol layer encryption and/or application protocol layer encryption.

The electronic device 201 may include a range of additional software applications 224, including, for example, a notepad application, voice communication (i.e. telephony) application, mapping application, a media player application, or any combination thereof. Each of the software applications 224 may include layout information defining the placement of particular fields and graphic elements (e.g. text fields, input fields, icons, etc.) in the user interface (i.e. the display 204) according to the application.

The software modules 220 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

Sharing of Camera-Related Features

Figure 4:
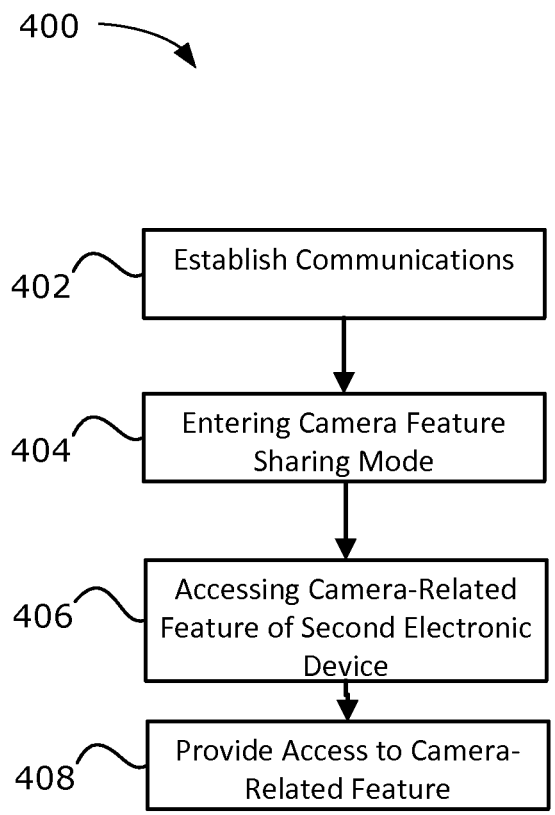
FIG. 4 is a flowchart of an example method for sharing one or more camera-related features in accordance with example embodiments of the present disclosure.

Referring now to FIG. 4, an example method 400 for sharing one or more camera-related features is illustrated in flowchart form. The method 400 includes features which may be provided by an electronic device 201, such as the electronic devices 201 of FIGS. 1 to 3.

More particularly, one or more applications or modules associated with an electronic device 201 (which may be the first electronic device 102 or the second electronic device 104), such as the camera feature sharing module 297 (FIG. 3), may contain processor readable instructions for causing a processor associated with the electronic device 201 to perform one or more steps of the method 400 of FIG. 4. That is, in at least some example embodiments, the electronic device 201 may be configured to perform the method 400 of FIG. 4. For example, the method 400 may be implemented by a processor 240 (FIG. 3) of an electronic device 201 (FIG. 3).

In at least some embodiments, one or more of the functions or features of the method 400 of FIG. 4 may be performed, in whole or in part, by another system, software application, module, component or device apart from those specifically listed above.

In at least some embodiments, a first electronic device 102 (FIGS. 1 and 2) may be configured to perform the method 400 of FIG. 4. Accordingly, in the following discussion, the method 400 is performed by the first electronic device 102. That is, the features are described largely as being performed by the first electronic device. However, the method 400 is performed in cooperation with a second electronic device 104 and the second electronic device could be configured in the same manner to perform the method 400 (i.e. the references to the "first electronic device 102" below could be replaced with references to "the second electronic device 104" and the references to the "second electronic device 104" below could be replaced with references to "the first electronic device 102"). Accordingly, in at least some embodiments, a second electronic device 104 (FIGS. 1 and 2) may be configured to perform the method 400 of FIG. 4.

At 402, wireless communications are established between the first electronic device and the second electronic device using a short range communication module 262 (FIG. 3) of the first electronic device 102. More particularly, the short range communication module 262 of the first electronic device 102 is configured to communicate with the second electronic device 104 via a short range communication module 262 of the second electronic device 104.

Such wireless communications are, in at least some embodiments, established when the first electronic device is located within range of the short range communication module of the second electronic device and when the second electronic device is located within range of the short range communication module of the first electronic device. In at least some such embodiments, 402 may be performed automatically when the first electronic device 102 and the second electronic device 104 are within such a range.

In at least some embodiments, at 402, the electronic devices may authenticate one another. For example, the first electronic device 102 may determine whether the second electronic device 104 is a trusted electronic device. That is, the first electronic device 102 may determine whether the second electronic device 104 has been paired with the first electronic device 102. Similarly, the second electronic device 104 may determine whether the first electronic device 102 is a trusted electronic device. In at least some embodiments, the electronic devices 102 and 104 may authenticate one another using one or more shared secrets.

In at least some embodiments, a multiple level authentication procedure may be used at 402. For example, a communications level authentication may authenticate the second electronic device using a shared secret associated with a communications protocol. For example, in some embodiments, a communications level authentication performed on the first electronic device 102 may authenticate the second electronic device 104 using a Bluetooth shared secret. The Bluetooth shared secret may have been created when the first electronic device 102 and the second electronic device 104 were connected for the first time and when they underwent a pairing procedure.

In at least some embodiments, at 402, the electronic devices also use an application level authentication. For example, in some embodiments, an application level authentication performed on the first electronic device 102 may authenticate the second electronic device 104 using a further shared secret. The further shared secret may, for example, be associated with a secure communication application 299 (FIG. 3) of the first electronic device 102. The secure communication application 299 (FIG. 3) is configured to provide a layer of security which further enhances the security provided by the communication protocol layer of security. The shared secret which is used by the secure communication application 299 may be a pairing key.

Accordingly, at 402, the first electronic device 102 establishes communications with a second electronic device 104. In at least some embodiments, the communications are direct communications. That is, the first electronic device 102 communicates directly with the second electronic device 104 without using an intermediary system, server, or device. For example, in at least some embodiments, the communications between the first electronic device 102 and the second electronic device 104 do not rely on an external router or modem.

In some embodiments, at 402, the first electronic device 102 may receive user input via an input interface 206 (FIG. 3) of the first electronic device 102 which allows the first electronic device 102 to select another electronic device which the first electronic device 102 will share camera-related features with. For example, a user may input an instruction to the first electronic device 102 which instructs the first electronic device to enter a camera-feature-sharing mode with the second electronic device. The input may instruct the first electronic device to share camera data with the selected electronic device. In at least some embodiments, the input may be received through an instant messaging application 298 (FIG. 3) associated with the first electronic device 102. For example, a user of the electronic device 102 may select a contact associated with the instant messaging application 298 (FIG. 3) and may authorize the first electronic device 102 to enter a camera-feature-sharing mode with an electronic device associated with that contact. In response to receiving such an input, the first electronic device may select an electronic device to share camera-related features with. That is, the first electronic device may select another electronic device which will be permitted to access a camera-related feature of the first electronic device 102. In at least some embodiments, the wireless communications will be established at 402 based on this selection.

After communications between the first electronic device and the second electronic device are established at 402, the first electronic device 102 and the second electronic device 104 may each enter a camera-feature-sharing mode at 404. In the camera-feature-sharing mode, the first electronic device 102 is permitted to access a camera-related feature of the second electronic device 104 using the short range communication module 262 (FIG. 3) of the first electronic device 102 (and using a similar short range communication module of the second electronic device 104). Similarly, in the camera-feature-sharing mode, the first electronic device 102 permits the second electronic device to access a camera-related feature of the first electronic device using the short range communication module 262 (FIG. 3) of the first electronic device 102 (and using a similar short range communication module of the second electronic device 104).

In at least some embodiments, the camera-feature-sharing mode is a bidirectional operating mode which allows either electronic device to access a camera-related feature of the other electronic device. For example, the first electronic device 102 may access a camera-related feature of the second electronic device 104 and the second electronic device 104 may access a camera-related feature of the first electronic device 102. That is, in at least some embodiments, in the camera-feature-sharing mode, the electronic devices 201 (i.e. the first electronic device 102 and the second electronic device 104) do not have a master/slave relationship); both of the electronic devices 201 are permitted to access a camera-related feature of the other of the electronic devices.

In at least some embodiments, in the camera-feature-sharing mode, the first electronic device 102 is permitted to access camera-related hardware of the second electronic device 104 and the second electronic device 104 is permitted to access camera-related hardware of the first electronic device 102. For example, as will be described in greater detail below with reference to FIG. 8, in some embodiments, one of the electronic devices may control a flash 255 of the other of the electronic devices 201 in order to use that flash as an auxiliary flash. Similarly, as will be described in greater detail below with reference to FIGS. 5 and 6, in at least some embodiments, an electronic device may use the camera 253 of the other electronic device. In at least some embodiments, camera data (which may, for example, be obtained from a rear facing camera) may be sent from an electronic device to another electronic device. In at least some embodiments, an electronic device is permitted to control the camera of the other electronic device. For example, an electronic device may cause another electronic device to capture an image.

As will be discussed in greater detail below with reference to FIG. 7, in at least some embodiments, in the camera-feature-sharing mode, the first electronic device 102 is permitted to access a camera-related software feature of the other electronic device. For example, in at least some embodiments, if one of the electronic devices does not have an image processing capability that the other electronic device has, then the electronic device may utilize the image processing capability of the other electronic device. For example, if an electronic device is not equipped with facial recognition but another electronic is equipped with facial recognition, then the electronic device which is not equipped with facial recognition may access facial recognition features from the other electronic device.

In at least some embodiments, at 404, in the camera-feature-sharing mode, a user interface is provided on the first electronic device 102 which allows a user of the first electronic device 102 to input commands to the first electronic device 102 to access camera-related features of the second electronic device 104. A similar user interface may also be provided on the second electronic device 104. For example, in at least some embodiments, the first electronic device 102 may display a selectable interface element which allows a user to access a camera-related feature of the second electronic device 104. For example, the first electronic device 102 may display one or more selectable interface elements to allow a user to: capture an image using a camera associated with the second electronic device 104, adjust a camera setting for the second electronic device 104, use a camera flash associated with the second electronic device as an auxiliary flash for the camera 253 of the first electronic device, and/or use an image processing capability of the second electronic device. Similar selectable interface elements may be displayed on the second electronic device 104 for inputting instructions to access corresponding features of the first electronic device.

In at least some embodiments, the first electronic device 102 may, at 404, consult one or more information technology (IT) policy rules to determine which camera-related features, if any, the second electronic device 104 will be permitted to access. The IT policy rules may be rules which are established by a system administrator for the electronic device or for an operating environment which the electronic device operates within. The IT policy rules may be stored on the electronic device or may be stored remotely and may be retrieved at 404. The IT policy rules may specify camera-related features which the electronic device is permitted to allow other electronic devices to access and/or camera-related features which the electronic device is permitted to access from other electronic devices. The IT policy rules may, in some embodiments, specify camera-related features which the electronic device is not permitted to allow other electronic devices to access and/or camera-related features which the electronic device is not permitted to access from other electronic devices. The IT policy rules may specify conditions related to such access. For example, the IT policy rules may specify timing information specifying when the electronic device is permitted to access camera-related features of other electronic devices and/or timing information when the electronic device is permitted to allow other electronic devices to access its camera-related features. In at least some such embodiments, at 404, the electronic device may consult a clock (not shown) associated with the electronic device to enable and/or disable the sharing of camera-related features according to the IT policy rules.

Similarly, the IT policy rules may specify location information specifying locations where the electronic device is permitted to access camera-related features of other electronic devices and/or location information specifying locations where the electronic device is permitted to allow other electronic devices to access its camera-related features. In at least some such embodiments, at 404, the electronic device may consult a location sensor (not shown) associated with the electronic device to enable and/or disable the sharing of camera-related features according to the IT policy rules. The location sensor is a sensor which may be used to determine the geographic location of the electronic device. By way of example, the location sensor may be a global positioning system (GPS) sensor.

Accordingly, in at least some embodiments, at 404, the first electronic device 102 may consult one or more IT policy rules and may enable and/or disable the sharing of camera-related features in accordance with the IT policy rules.

In at least some embodiments, the camera-feature-sharing mode allows the first electronic device 102 to access features of the second electronic device 104 and the second electronic device 104 to access features of the first electronic device 102 using multi-layered encrypted communications. For example, when camera data is sent between the electronic devices it may be transmitted in a format which is encrypted at multiple layers. For example, the multilayered encrypted communications which are used to send and receive camera data between the electronic devices may include a communication protocol encryption layer and also an application protocol encryption layer. These layers of encryption are described in greater detail above with reference to FIG. 3.

Referring still to FIG. 4, in at least some embodiments, at 406, while in the camera-feature-sharing mode, the first electronic device 102 may access a camera-related feature of the second electronic device 104. In at least some embodiments, at 406, the first electronic device 102 may send an instruction, request or command to the second electronic device 104 requesting access to a camera-related feature of the second electronic device 104. The second electronic device 104, upon receiving the instruction, request or command, may provide access to the requested feature. Specific features which may be accessed at 406 will be described in greater detail below with reference to FIGS. 5, 7 and 8. Such an instruction, request or command may, for example, be sent from the first electronic device 102 in response to a user request to access a camera-related feature of the second electronic device 104. The user request may be received via the input interface of the first electronic device.

In other embodiments, the second electronic device 104 may allow the first electronic device 102 to access a camera-related feature of the second electronic device without a specific request from the first electronic device. For example, when the first electronic device 102 and the second electronic device 104 are both placed in the camera-feature-sharing mode, then the second electronic device 104 may automatically begin to send camera data obtained by its camera to the first electronic device 102.

In at least some embodiments, at 408, while in the camera-feature-sharing mode, the first electronic device 102 may provide, to the second electronic device 104, access to a camera-related feature of the first electronic device. In at least some embodiments, the first electronic device 102 may provide access to the camera-related feature of the first electronic device 102 concurrently while the first electronic device 102 accesses a camera-related feature of the second electronic device 104. For example, in at least some embodiments, the first electronic device 102 may send, to the second electronic device 104, first-device camera data from a camera associated with the first electronic device and may, at the same time, receive second-device camera data from the second electronic device (the second-device camera data may be camera data generated from a camera of the second electronic device). In at least some embodiments, the cameras used to generate the first-device camera data and the second-device camera data are rear-facing cameras. Specific camera-related features which the first electronic device 102 may provide the second electronic device 104 access to will be described in greater detail below with reference to FIG. 6.

In at least some embodiments, in the camera-feature-sharing mode, the first electronic device 102 may accept instructions, requests or commands from the second electronic device 104 for access to a camera-related feature of the first electronic device 102. In response to receiving such requests, the first electronic device 102 may allow the second electronic device 104 to access the requested feature. In some embodiments, the first electronic device 102 may allow the second electronic device 104 to access a camera-related feature of the second electronic device 104 without specific request from the first electronic device 102. For example, when the first electronic device 102 and the second electronic device 104 are both placed in the camera-feature-sharing mode, then the first electronic device 102 may automatically begin to send camera data obtained by its camera to the second electronic device 104.

Accessing Camera-Related Feature of Second Electronic Device from First Electronic Device Accordingly, in at least some embodiments, the first electronic device 102 is configured to access a camera-related feature of a second electronic device 104. Example camera-related features which the first electronic device 102 may access on the second electronic device 104 will now be discussed with reference to FIG. 5.

Figure 5:
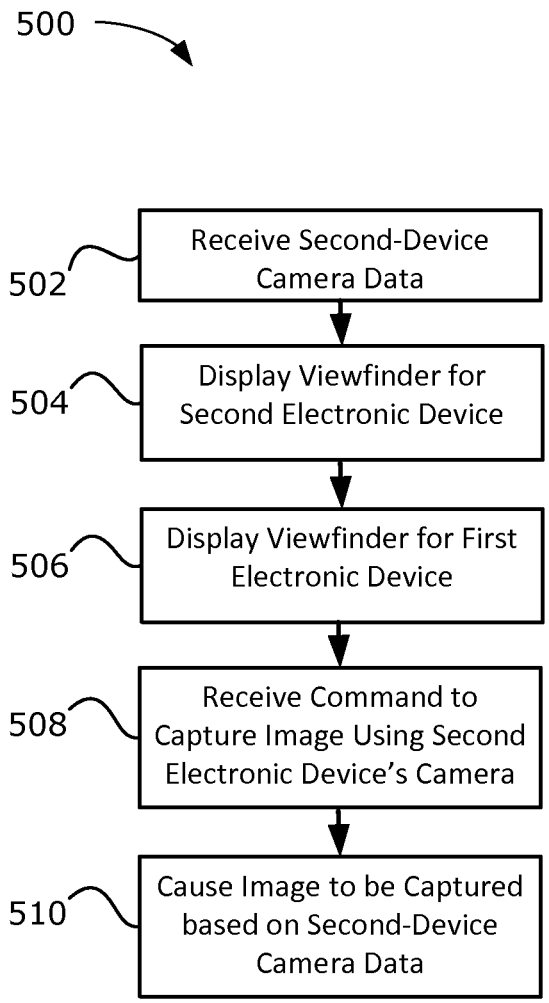
FIG. 5 is a flowchart of an example method for accessing a camera-related feature of a second electronic device from a first electronic device in accordance with example embodiments of the present disclosure.

Referring now to FIG. 5, an example method 500 for accessing a camera-related feature of a second electronic device is illustrated in flowchart form. The method 500 includes features which may be provided by an electronic device 201, such as the electronic devices 201 of FIGS. 1 to 3.

More particularly, one or more applications or modules associated with an electronic device 201 (which may be the first electronic device 102), such as the camera feature sharing module 297 (FIG. 3), may contain processor readable instructions for causing a processor associated with the electronic device 201 to perform one or more steps of the method 500 of FIG. 5. That is, in at least some example embodiments, the electronic device 201 may be configured to perform the method 500 of FIG. 5. For example, the method 500 may be implemented by a processor 240 (FIG. 3) of an electronic device 201 (FIG. 3).

In at least some embodiments, one or more of the functions or features of the method 500 of FIG. 5 may be performed, in whole or in part, by another system, software application, module, component or device apart from those specifically listed above.

In at least some embodiments, a first electronic device 102 (FIGS. 1 and 2) may be configured to perform the method 500 of FIG. 5. Accordingly, in the following discussion, the method 500 is performed by the first electronic device 102. That is, the features are described largely as being performed by the first electronic device. However, the method 500 is performed in cooperation with a second electronic device and a second electronic device could be configured in the same manner to perform the method 500 (i.e. the references to the "first electronic device 102" below could be replaced with references to "the second electronic device 104" and the references to the "second electronic device 104" below could be replaced with references to "the first electronic device 102"). Accordingly, in at least some embodiments, a second electronic device 104 (FIGS. 1 and 2) may be configured to perform the method 500 of FIG. 5.

In at least some embodiments, the method 500 may be performed at 406 of the method 400 of FIG. 4.

In at least some embodiments, the first electronic device 102 receives second-device camera data from the second electronic device 104 at 502. The second-device camera data represents one or more optical images observed by a camera associated with the second electronic device. The second-device camera data may be camera data which is generated by a rear-facing camera of the second electronic device and may be sent from the second electronic device 104 and received at the first electronic device 102 in real-time or near real-time. That is, the first electronic device 102 receives the second-device camera data shortly after it is obtained from the camera of the second electronic device 104.

In at least some such embodiments, the first electronic device 102 may use the received second-device camera data to provide a viewfinder for the second electronic device 104 on a display 204 (FIGS. 1 to 3) of the first electronic device 102. That is, the first electronic device may, at 504, display a viewfinder for the second electronic device on a display of the first electronic device based on the received second-device camera data. Accordingly, the display 204 of the first electronic device 102 may display the field of view of the camera of the second electronic device 104 (which may be a rear-facing camera). This allows a user of the first electronic device 102 to see where a rear-facing camera 253 of the second electronic device 104 is directed and, in at least some embodiments, to see where the flash 255 of the second electronic device 104 is directed (since the flash is generally pointed in the same direction as the field of view of the camera).

In at least some embodiments, at 506, the first electronic device 102 may also display a viewfinder for a camera 253 of the first electronic device 102. In at least some embodiments, the viewfinder for the first electronic device's camera 253 (which may be referred to as a first viewfinder) may be displayed concurrently with the viewfinder for the second electronic device's camera (which may be referred to as a second viewfinder). That is, the viewfinder displayed at 506 may be displayed at the same time as the viewfinder displayed at 504. Accordingly, these viewfinders may collectively form a multi-camera viewfinder. More particularly, a portion of the display 204 of the first electronic device 102 may act as a viewfinder for the first electronic device's camera and another portion of the display 204 of the first electronic device 102 may act as a viewfinder for the second electronic device's camera.

In at least some embodiments, the first viewfinder and the second viewfinder may each have one or more interface elements associated therewith. For example, the first viewfinder may have a selectable interface element (such as a button) which a user may select to cause an image to be captured based on first-device camera data (i.e. based on camera data generated from the camera of the first electronic device). Similarly, the second viewfinder may have a selectable interface element (such as a button) which a user may select to cause an image to be captured based on second-device camera data (i.e. based on camera data generated from the camera of the second electronic device). A user of the electronic device may select one of the interface elements using an input interface 206, such as a touchscreen display, associated with the first electronic device 102. Accordingly, a user of the first electronic device 102 may cause an image to be captured using either the camera of the first electronic device, the camera of the second electronic device, or both.

Accordingly, in at least some embodiments, the first electronic device 102 may, in the camera-feature-sharing mode, provide a user interface which permits a user to input a command to capture an image using a camera associated with the second electronic device 104. At 508, the first electronic device 102 may receive a command to capture an image using a camera associated with the second electronic device 104.

In at least some embodiments, at 510, in response to receiving the command to capture the image using a camera associated with the second electronic device 104, the first electronic device 102 causes an image to be captured based on second-device camera data generated from the camera associated with the second electronic device 104.

In at least some embodiments, at 510, the first electronic device 102 may send a command to the second electronic device 104 which instructs the second electronic device 104 to capture an image using its camera. The second electronic device 104 may then capture the image (for example, by triggering a shutter associated with the camera, causing the flash to trigger and/or committing an image to memory based on camera data generated from the camera). In at least some embodiments, the second camera may automatically send the captured image to the first electronic device 102 and the first electronic device 102 may receive the image and may store it in memory.

In some embodiments in which the first electronic device 102 acts as a viewfinder for the second electronic device 104, at 510, the first electronic device may store an image in memory based on second-device camera data which was used for the viewfinder. That is, rather than instruct the second electronic device 104 to obtain new second-device camera data, the first electronic device may simply use second-device camera data which was recently received and may store an image in memory based on this recently-received camera data.

While the method 500 of FIG. 5 was described as being provided by the first electronic device 102, the second electronic device may be configured to perform the method in order to provide one or more of the functions of the method 500. For example, as noted above, in at least some embodiments, the camera-feature-sharing mode provides for bidirectional sharing of camera-related features. In such embodiments, the method 500, or a portion thereof may be performed by both the first electronic device 102 and the second electronic device 104.

Providing Access to Camera-Related Feature of First Electronic Device

As noted in the discussion of FIG. 4 above, in at least some embodiments, the first electronic device 102 is configured to provide the second electronic device 104 with access to a camera-related feature of the first electronic device 102. Example camera related-features which the first electronic device 102 may provide access to will now be discussed with reference to FIG. 6.

Figure 6:
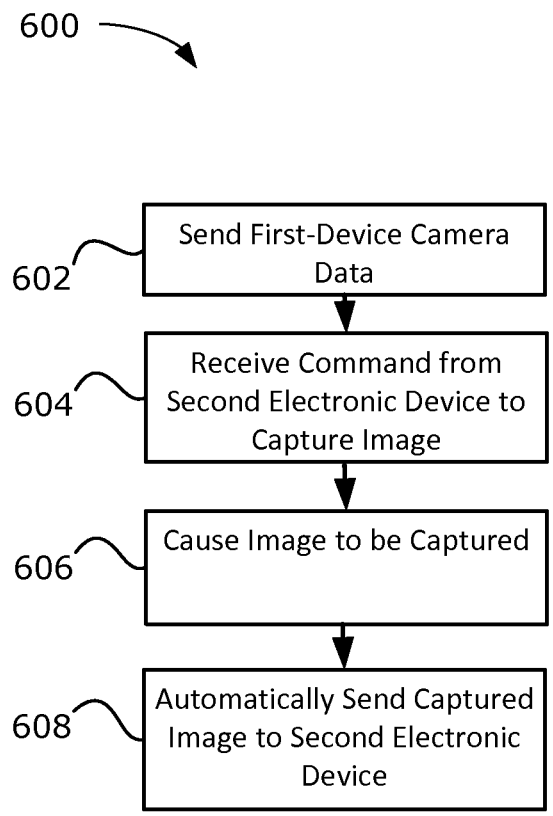
FIG. 6 is a flowchart of an example method for providing access to a camera-related feature of a first electronic device in accordance with example embodiments of the present disclosure.

Referring now to FIG. 6, an example method 600 for a providing access to a camera-related feature of a first electronic device is illustrated in flowchart form. The method 600 includes features which may be provided by an electronic device 201, such as the electronic devices 201 of FIGS. 1 to 3.

More particularly, one or more applications or modules associated with an electronic device 201 (which may be the first electronic device 102), such as the camera feature sharing module 297 (FIG. 3), may contain processor readable instructions for causing a processor associated with the electronic device 201 to perform one or more steps of the method 600 of FIG. 6. That is, in at least some example embodiments, the electronic device 201 may be configured to perform the method 600 of FIG. 6. For example, the method 600 may be implemented by a processor 240 (FIG. 3) of an electronic device 201 (FIG. 3).

In at least some embodiments, one or more of the functions or features of the method 600 of FIG. 6 may be performed, in whole or in part, by another system, software application, module, component or device apart from those specifically listed above.

In at least some embodiments, a first electronic device 102 (FIGS. 1 and 2) may be configured to perform the method 600 of FIG. 6. Accordingly, in the following discussion, the method 600 is performed by the first electronic device 102. That is, the features are described largely as being performed by the first electronic device. However, the method 600 is performed in cooperation with a second electronic device and a second electronic device could be configured in the same manner to perform the method 600 (i.e. the references to the "first electronic device 102" below could be replaced with references to "the second electronic device 104" and the references to the "second electronic device 104" below could be replaced with references to "the first electronic device 102"). Accordingly, in at least some embodiments, a second electronic device 104 (FIGS. 1 and 2) may be configured to perform the method 600 of FIG. 6.

In at least some embodiments, the method 600 may be performed at 408 of the method 400 of FIG. 4.

At 602 the first electronic device 102 sends first-device camera data to the second electronic device 104. The first-device camera data represents one or more optical images observed by the camera of the first electronic device 102. That is, the first-device camera data may be generated by a camera 253 of the first electronic device 102, such as a rear-facing camera and may, at 602, be sent to the second electronic device 104. The first-device camera data is, in at least some embodiments, sent in real-time or near real-time. That is, in at least some embodiments, the first-device camera data is sent to the second electronic device shortly after it is obtained from the camera 253. In at least some embodiments, the second electronic device 104 may use the camera data to provide a viewfinder for the camera of the first electronic device 102.

In some embodiments, at 604, the first electronic device 102 may receive a request from the second electronic device 104 to capture an image using the camera 253 of the first electronic device 102. In response to receiving this request, at 606, the first electronic device 102 may capture an image at the camera 253 of the first electronic device 102. In at least some embodiments, at 606, the first electronic device may: trigger a shutter associated with the camera, trigger the flash 255 and/or commit an image to memory based on camera data generated from the camera.

In at least some embodiments, after the first electronic device captures the image at 606, the electronic device may, at 608, automatically send the captured image to the second electronic device 104. In at least some embodiments, this automatic step may be performed without any further input from a user.

While the method 600 of FIG. 6 was described as being provided by the first electronic device 102, the second electronic device may be configured to perform the method in order to provide one or more of the functions of the method 600. For example, as noted above, in at least some embodiments, the camera-feature-sharing mode provides for bidirectional sharing of camera-related features. In such embodiments, the method 600, or a portion thereof may be performed by both the first electronic device 102 and the second electronic device 104.

Accessing Image-Processing Capability of Second Electronic Device

In at least some embodiments, in the camera-feature-sharing mode, the first electronic device may access an image processing capability of the second electronic device if the second electronic device has an image processing capability that the first electronic device does not have. Similarly, the second electronic device may access an image processing capability of the first electronic device if the first electronic device has an image processing capability that the second electronic device does not have.

Figure 7:
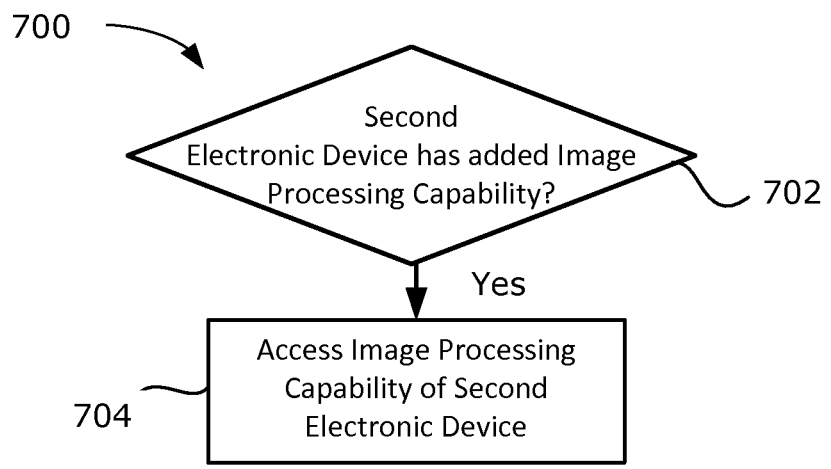
FIG. 7 is a flowchart of an example method for allowing a first electronic device to access an image processing capability of a second electronic device in accordance with example embodiments of the present disclosure.

Referring now to FIG. 7, an example method 700 for accessing an image-processing capability of a second electronic device is illustrated. The method 700 includes features which may be provided by an electronic device 201, such as the electronic devices 201 of FIGS. 1 to 3.

More particularly, one or more applications or modules associated with an electronic device 201 (which may be the first electronic device 102), such as the camera feature sharing module 297 (FIG. 3), may contain processor readable instructions for causing a processor associated with the electronic device 201 to perform one or more steps of the method 700 of FIG. 7. That is, in at least some example embodiments, the electronic device 201 may be configured to perform the method 700 of FIG. 7. For example, the method 700 may be implemented by a processor 240 (FIG. 3) of an electronic device 201 (FIG. 3).

In at least some embodiments, one or more of the functions or features of the method 700 of FIG. 7 may be performed, in whole or in part, by another system, software application, module, component or device apart from those specifically listed above.

In at least some embodiments, a first electronic device 102 (FIGS. 1 and 2) may be configured to perform the method 700 of FIG. 7. Accordingly, in the following discussion, the method 700 is performed by the first electronic device 102. That is, the features are described largely as being performed by the first electronic device. However, the method 700 is performed in cooperation with a second electronic device and a second electronic device could be configured in the same manner to perform the method 700 (i.e. the references to the "first electronic device 102" below could be replaced with references to "the second electronic device 104" and the references to the "second electronic device 104" below could be replaced with references to "the first electronic device 102"). Accordingly, in at least some embodiments, a second electronic device 104 (FIGS. 1 and 2) may be configured to perform the method 700 of FIG. 7.

In at least some embodiments, the method 700 may be performed at 406 of the method 400 of FIG. 4.

At 702, the first electronic device 102 determines if the second electronic device 104 has an image processing capability which the first electronic device 102 does not have. By way of example, in some embodiments, the image processing capability may be facial recognition. Facial recognition is a process of scanning a face in order to match the face up to a library of known faces. The determination, at 702, may be made with help from the second electronic device 104. For example, the first electronic device 102 may send a request to the second electronic device 104 to ask the second electronic device 104 whether it has the image processing capability. The second electronic device 104 may then inform the first electronic device whether it has the requested capability.

If the second electronic device 104 has an image processing capability which the first electronic device 102 does not have, then at 704 the first electronic device may access the image processing capability of the second electronic device. In at least some embodiments, the first electronic device 102 may, at 704, send the second electronic device 104 an image to be analyzed and may, in response, receive information about the analyzed image. For example, where the image processing capability is facial recognition, the first electronic device 102 may receive, from the second electronic device 104, an identifier of the person represented in the image. For example, the first electronic device 102 may receive a name associated with the person.

Use Second Electronic Device as Auxiliary Flash

In at least some embodiments, the first electronic device 102 may use a flash 255 of the second electronic device 104 as an auxiliary flash. That is, a first electronic device 102 may be permitted to access a camera flash feature of a second electronic device 104 and/or a second electronic device 104 may be permitted to access a camera flash feature of a first electronic device 102. More particularly, one of the electronic devices 201 may trigger the flash associated with the other of the electronic devices.

Figure 8:
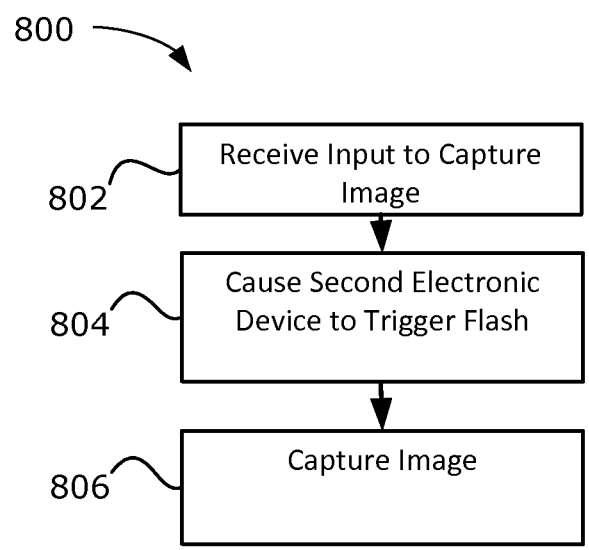
FIG. 8 is a flowchart of an example method for utilizing a flash on a second electronic device to capture an image on a first electronic device in accordance with example embodiments of the present disclosure.

Referring now to FIG. 8, an example of one such method 800 is illustrated. The method 800 includes features which may be provided by an electronic device 201, such as the electronic devices 201 of FIGS. 1 to 3.

More particularly, one or more applications or modules associated with an electronic device 201 (which may be the first electronic device 102), such as the camera feature sharing module 297 (FIG. 3), may contain processor readable instructions for causing a processor associated with the electronic device 201 to perform one or more steps of the method 800 of FIG. 8. That is, in at least some example embodiments, the electronic device 201 may be configured to perform the method 800 of FIG. 8. For example, the method 800 may be implemented by a processor 240 (FIG. 3) of an electronic device 201 (FIG. 3).

In at least some embodiments, one or more of the functions or features of the method 800 of FIG. 8 may be performed, in whole or in part, by another system, software application, module, component or device apart from those specifically listed above.

In at least some embodiments, a first electronic device 102 (FIGS. 1 and 2) may be configured to perform the method 800 of FIG. 8. Accordingly, in the following discussion, the method 800 is performed by the first electronic device 102. That is, the features are described largely as being performed by the first electronic device. However, the method 600 is performed in cooperation with a second electronic device and a second electronic device could be configured in the same manner to perform the method 800 (i.e. the references to the "first electronic device 102" below could be replaced with references to "the second electronic device 104" and the references to the "second electronic device 104" below could be replaced with references to "the first electronic device 102"). Accordingly, in at least some embodiments, a second electronic device 104 (FIGS. 1 and 2) may be configured to perform the method 800 of FIG. 8.

In at least some embodiments, the method 800 may be performed at 406 of the method 400 of FIG. 4.

At 802, the first electronic device 102 receives input instructing the first electronic device 102 to capture an image from the camera 253 of the first electronic device 102. The input may be received, for example, via an input interface 206 (FIG. 3) associated with the first electronic device 102; for example, a user may press a camera-shutter button.

In response to receiving the input instructing the first electronic device 102 to capture the image, the first electronic device 102 may, at 804, cause the second electronic device 104 to trigger a flash 255 associated with the second electronic device and may, at 806, capture an image using the camera 253 associated with the first electronic device 102. The image may be captured shortly after the flash of the second electronic device 104 is triggered so that the second electronic device acts as an auxiliary flash for the first electronic device 102.

While the present application is primarily described in terms of methods, a person of ordinary skill in the art will understand that the present application is also directed to various apparatus such as a handheld electronic device and a server. The handheld electronic device and the server includes components for performing at least some of the example aspects and features of the described methods, be it by way of hardware components (such as the memory and/or the processor), software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A method, performed by a first electronic device, the first electronic device having a camera, the method comprising:
  receive, at the first electronic device, a selection of a second electronic device in a camera-feature-sharing application and an instruction to share camera-related features of the first electronic device with the second electronic device;
  establishing wireless communications between the first electronic device and the second electronic device using a short range communication module of the first electronic device; and
  entering a camera-feature-sharing mode in which an image processing capability of the second electronic device is accessible to the first electronic device using the short range communication module.

2. The method of claim 1, further comprising, while in the camera-feature-sharing mode, accessing the image processing capability of the second electronic device.

3. The method of claim 1, further comprising:
  determining that the second electronic device has a first image processing capability which the first electronic device does not have; and after determining that the second electronic device has the first image processing capability, accessing the first image processing capability of the second electronic device.

4. The method of claim 3, wherein determining that the second electronic device has the first image processing capability comprises:
sending a request to the second electronic device to indicate whether the second electronic device has the first image processing capability.

5. The method of claim 1, further comprising sending, to the second electronic device, an image to be analyzed and a request to receive, at the first electronic device, information about the image based on an analysis of the image, by the second electronic device, using the image processing capability of the second electronic device.

6. The method of claim 1, wherein the image processing capability of the second electronic device is facial recognition.

7. The method of claim 6, further comprising sending, to the second electronic device, an image to be analyzed and a request to receive, at the first electronic device, an identifier of a person represented in the image, the identifier of the person determined by the second electronic device based on an analysis of the image, by the second electronic device, using facial recognition capability of the second electronic device.

8. The method of claim 7, wherein the identifier is a name associated with the person.

9. The method of claim 1, wherein, in the camera-feature-sharing mode, an image processing capability of the first electronic device is accessible to the second electronic device using the short-range communication module.

10. The method of claim 9, further comprising, while in the camera-feature-sharing mode:
providing, to the second electronic device, access to the image processing capability of the first electronic device.

11. A first electronic device comprising:
a camera;
a short range communication module;
a processor coupled to the camera and the short range communication module, the processor configured to:
receive a selection of a second electronic device in a camera-feature-sharing application and an instruction to share camera-related features of the first electronic device with the second electronic device;
establish wireless communications between the first electronic device and the second electronic device using the short range communication module; and
enter a camera-feature-sharing mode in which an image processing capability of the second electronic device is accessible to the first electronic device using the short range communication module.

12. The electronic device of claim 11, wherein the processor is configured to, while in the camera-feature-sharing mode, access the image processing capability of the second electronic device.

13. The electronic device of claim 11, wherein the processor is further configured to:
determine that the second electronic device has a first image processing capability which the first electronic device does not have; and
after determining that the second electronic device has the first image processing capability, access the first image processing capability of the second electronic device.

14. The electronic device of claim 13, wherein determining that the second electronic device has the first image processing capability comprises:
sending a request to the second electronic device to indicate whether the second electronic device has the first image processing capability.

15. The electronic device of claim 11, wherein the processor is further configured to send, to the second electronic device, an image to be analyzed and a request to receive, at the first electronic device, information about the image based on an analysis of the image, by the second electronic device, using the image processing capability of the second electronic device.

16. The electronic device of claim 11, wherein the image processing capability of the second electronic device is facial recognition.

17. The electronic device of claim 16, wherein the processor is further configured to send, to the second electronic device, an image to be analyzed and a request to receive, at the first electronic device, an identifier of a person represented in the image, the identifier of the person determined by the second electronic device based on an analysis of the image, by the second electronic device, using facial recognition capability of the second electronic device.

18. The electronic device of claim 17, wherein the identifier is a name associated with the person.

19. The electronic device of claim 11, wherein, in the camera-feature-sharing mode, an image processing capability of the first electronic device is accessible to the second electronic device using the short-range communication module.

* * * * *